United States Patent [19]

Bannister

[11] Patent Number: 4,661,681

[45] Date of Patent: Apr. 28, 1987

[54] ROBOTIC MARKING MACHINE

[75] Inventor: Robert D. Bannister, Loveland, Ohio

[73] Assignee: Cincinnati Milacron Inc., Cincinnati, Ohio

[21] Appl. No.: 915,581

[22] Filed: Oct. 6, 1986

[51] Int. Cl.⁴ .............................................. B23K 26/02
[52] U.S. Cl. ...................... 219/121 LU; 219/121 LH; 219/121 LQ; 219/121 LV
[58] Field of Search ................. 219/121 LU, 121 LV, 219/121 LH, 121 LJ, 121 LC, 121 LD, 121 LG, 121 LN, 121 L, 121 LM, 121 LQ, 121 LA, 121 LB; 364/474, 475

[56] References Cited

U.S. PATENT DOCUMENTS 4,607,150  8/1986  Bannister ...................... 219/121 LC
4,626,999 12/1986  Bannister ............................ 364/474

FOREIGN PATENT DOCUMENTS 0178011  4/1986  European Pat. Off. ...... 219/121 LQ
  21491  2/1984  Japan ........................... 219/121 LQ
2153785  8/1985  United Kingdom ............ 219/121 L Primary Examiner—C. L. Albritton
Attorney, Agent, or Firm—Thomas M. Farrell

[57]  ABSTRACT

An articulatable robotic machine has a forearm and wrist unit capable of handling an internal laser beam received at the aft end of the forearm and exiting at the forward end of the forearm through the wrist unit tooling plate. A laser marker galvohead and collimator are affixed to the tooling plate of the wrist, and a laser generator is affixed to the forearm of the robot machine and provided with a laser beam system to direct a laser beam into the aft end of the laser arm. The output pattern galvohead may be manipulated to a variety of predetermined positions on a workpiece.

3 Claims, 5 Drawing Figures

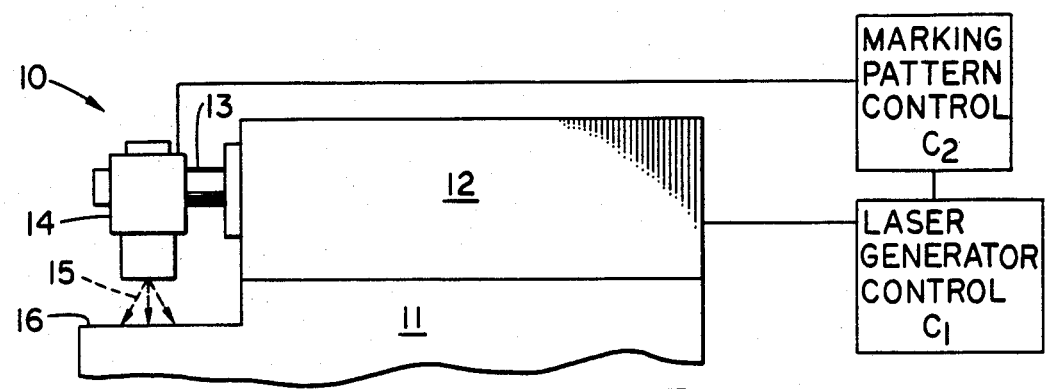
(PRIOR ART) FIG. 1
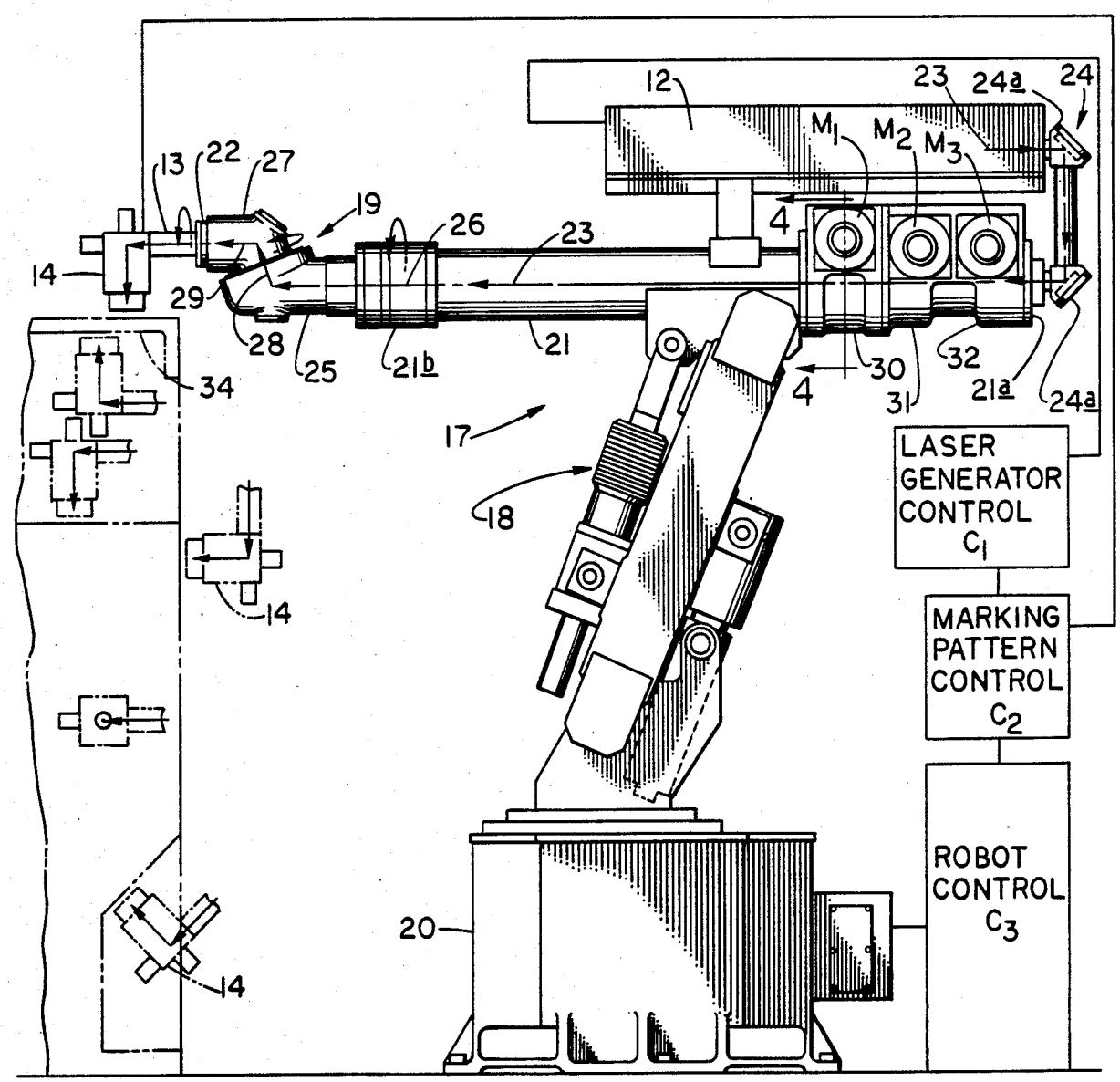
FIG. 2

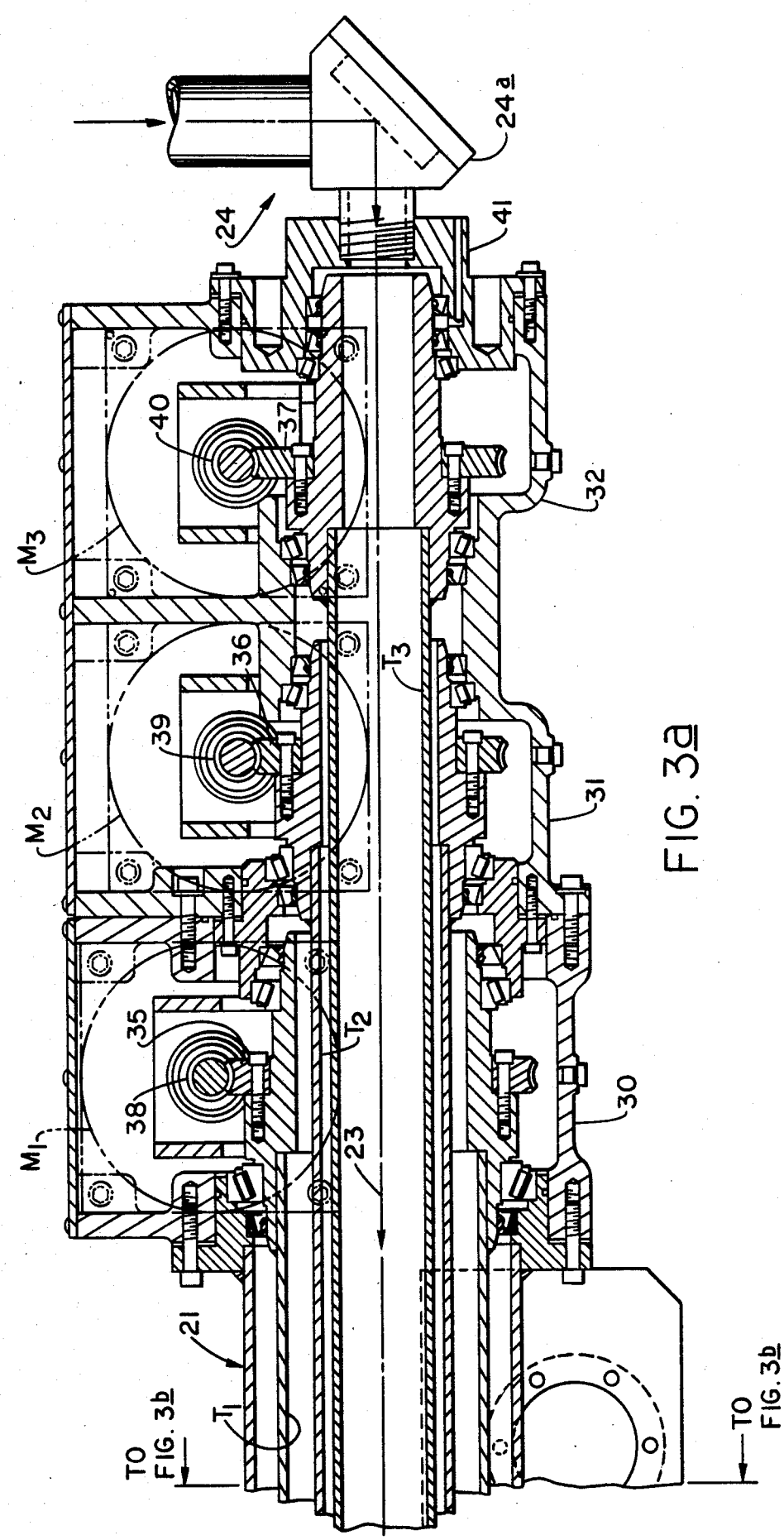

ROBOTIC MARKING MACHINE

BACKGROUND OF THE INVENTION

The invention relates generally to laser marking units, and is particularly directed to multistation applications through use of a robotic machine.

Laser making units have been utilized for a number of years for marking a variety of workpieces, and these markers are particularly effective where it is desired to mark very hard surfaces. Laser markers are also highly desirable since an investment does not have to be made in hard tooling, and the patterns, therefor, can be changed frequently at minimal cost without the need for scrapping or revising tooling.

Laser marking stations have been used in the automotive field for marking certain components and body parts, and as a result of recent legislation, the automotive industry will be required to mark still more parts and as many as fourteen different locations on an automobile body.

One drawback to prior art laser makers is that the entire unit, i.e. laser control unit, laser collimator and marking head, or "galvohead" are fixed at one particular location with the laser pattern output directed to one fixed marking point. In other words, the units lack portability.

Applicant has obviated the difficulties inherent in the prior art laser marker units by incorporating therewith an articulatable robotic machine, which is capable of handling a laser beam internally, thereby presenting a compact assembly which can be maneuvered in and about an automobile body, for instance, for marking a plurality of positions, in a variety of attitudes.

SUMMARY OF THE INVENTION

The invention is shown embodied in an articulatable robotic machine, forming a robotic marking system, wherein a laser forearm is movable on the robotic structure and has an internal beam path connecting forward and aft ends of the movable forearm. A laser beam source is connected to the aft end of the forearm and provides a laser beam through the forearm. A laser wrist is carried at the forward end of the forearm for receiving and manipulating an internally-carried laser beam, wherein the wrist carries a tooling plate and has means for automatically moving the tooling plate with respect to the forearm. A laser marker galvohead is affixed to the tooling plate, the head including galvohead means for moving the laser beam through a predetermined output pattern with respect to the tooling plate. First control means is provided for moving the tooling plate through predetermined spatial orientations; a second control means is provided for driving the galvohead means to produce the output pattern; and, third control means actuates the laser beam source.

BRIEF DESCRIPTION OF THE DRAWINGS

FIG. 1 is a side elevational view of a prior art, fixed station laser marker unit.

FIG. 2 is a side elevational view of a robotic marker machine.

FIG. 3a is a side elevational section through the aft end of the forearm unit of the robotic machine of FIG. 2.

DESCRIPTION OF THE PREFERRED EMBODIMENT

Figure 3B:
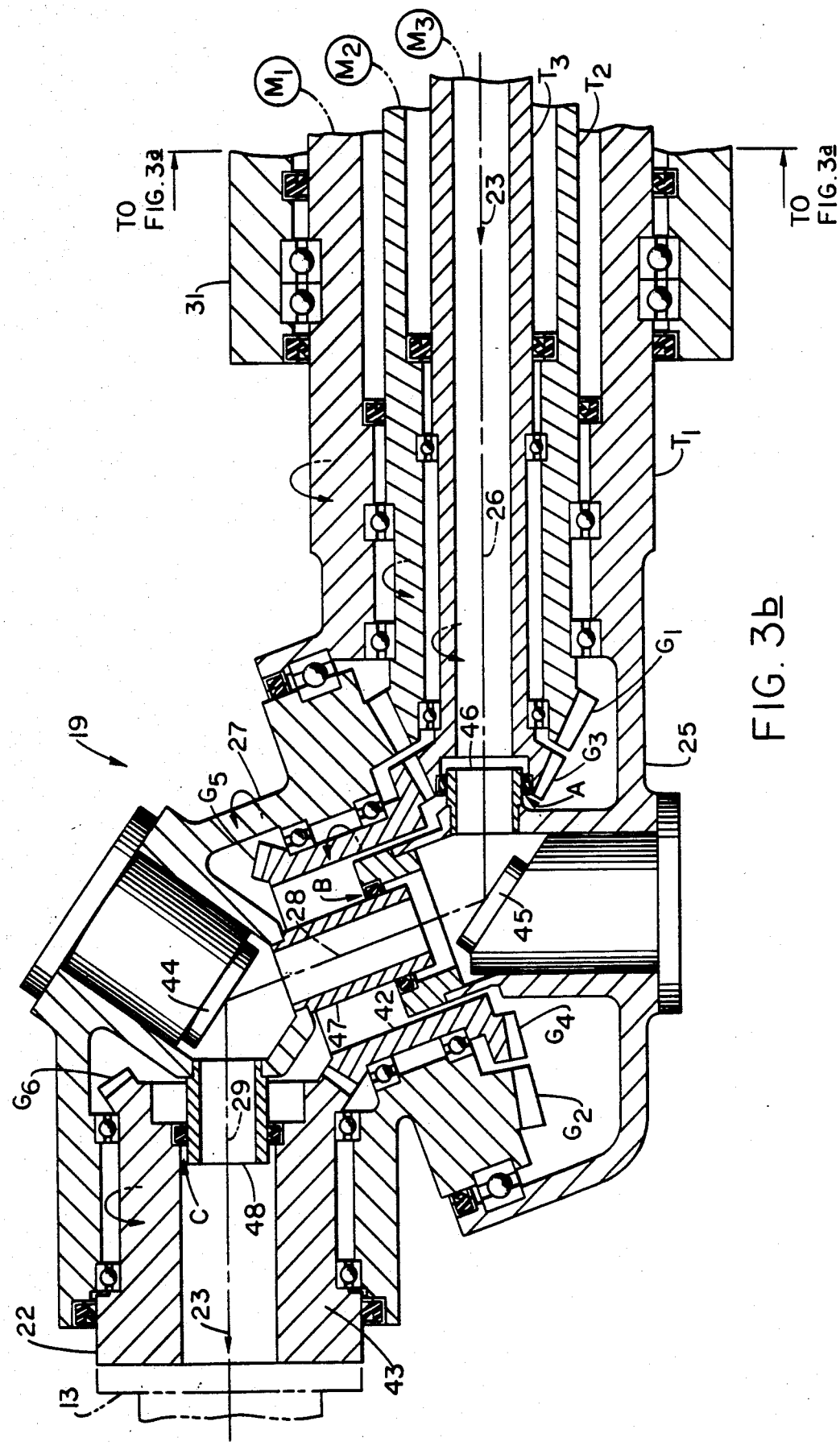
FIG. 3b is a side elevational section through the wrist unit and forward end of the forearm unit of the robotic machine of FIG. 2.

FIG. 1 of the drawings depicts a prior art, fixed-station laser marker unit 10, wherein a station base 11 is provided, and on which is mounted a laser generator unit 12, having a laser beam collimator attached to its output end, in turn supporting a laser marking head, or galvohead 14. A laser generator control C1 is provided to control the laser output, and a marker pattern control C2 is provided to control the galvohead 14, so that the laser beam 15 will produce a predetermined marking pattern on a target surface 16. Typical patterns might be used to mark part numbers, or to produce designs, trademarks, etc. The galvohead 14 is capable of a high response rate in directing the beam 15 through a pattern.

A robotic marker machine 17 is depicted in FIG. 2, wherein the laser generator unit 12 is separated from the galvohead 14 and collimator 13. A unique articulatable laser robot 18 is depicted, and is capable of moving a wrist unit 19 through a variety of multispatial orientations with respect to the robotic base 20. The laser robot 18 is the subject of a copending patent application of R. C. Monteith and R. E. Borgman, Ser. No. 840,637, entitled "Laser Robot", and assigned to the assignee of this invention, the disclosure of which is incorporated by reference herein. Reference may also be had to my co-pending U.S. patent application for a laser robot, Ser. No. 601,784, depicting a laser generator mounted end-for-end the reverse of the present design. The laser generator unit 12 is mounted proximal to the aft end 21a of the robotic forearm 21, and the galvohead 14 is affixed to a tooling plate 22 at the wrist unit 19 on the forward end 21b of the forearm 21. The laser generator unit 12 produces an output laser beam 23 which is ducted through a light pipe system 24 including a pair of 90° mirror units 24a and into the aft end 21a of the forearm 21, wherein the beam 23 travels internally through the forearm 21 and wrist unit 19, subsequently exiting through the collimator and galvohead 14. The wrist unit 19 is basically comprised of a base housing 25 which is mounted for movement about the centerline beam path i.e. a first roll axis 26 of the forearm 21, and the base housing 25 supports a turret housing 27, which is power-driven around a second roll axis 28 intercepting the first roll axis 26. The turret housing 27 in turn, carries the rotatable tooling plate 22 which is free to rotate about a third roll axis 29, intercepting the second roll axis 28. Thus, "three-roll" movement may be employed, fully manipulating the galvohead 14 and laser beam 23. The wrist unit 19 is power-driven by three motors, M1, M2, and M3, which are remotely located on suitable gear boxes 30,31,32 at the aft end 21a of the forearm 21.

A robotic control C3 is employed, and is coordinated with the laser control C1 and the marking pattern control C2. While the units have been depicted as separate, it may be appreciated that they may be embodied within a common control console. A typical workpiece 33 is depicted in phantom, at which the galvohead 14 is shown oriented to a variety of spatial positions, to mark the various surfaces. The galvohead 14 may be also transported within a cavity 34 of the workpiece 33 and such a workpiece 33 might comprise an automobile body, for example.

Figure 4:
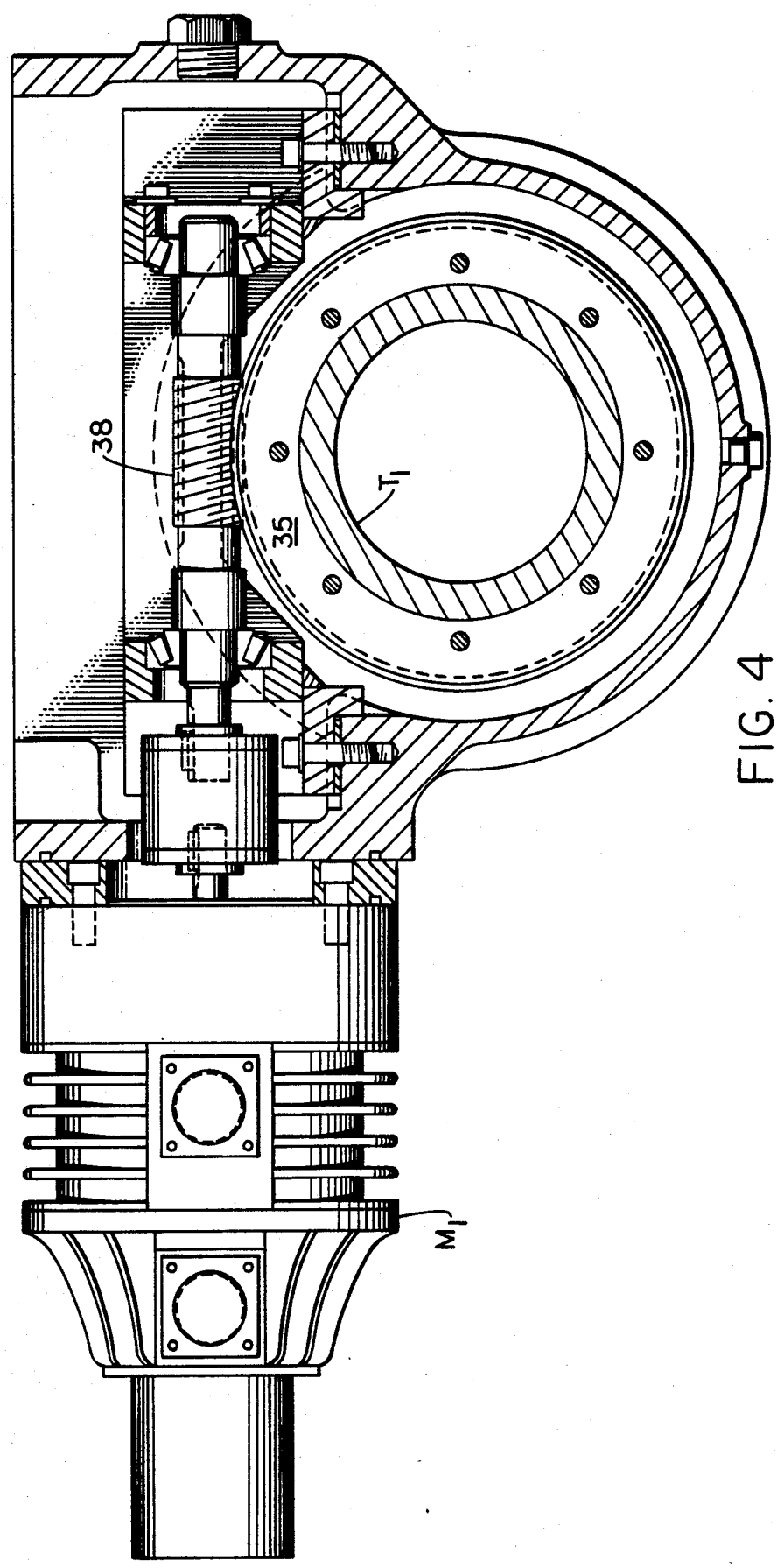
FIG. 4 is a section through a typical wrist drive motor taken along the line 4—4 of FIG. 2.

Referring to FIG. 3a, i.e. a section through the forearm 21, a plurality of concentric drive tubes, T1, T2, and T3 are provided with worm wheels 35,36,37, which are driven respectively by worms 38,39,40 connected to the respective drive motors, M1, M2, and M3 (see FIG. 4). The laser beam 23 is received from the closed light pipe system 24 through the 90° mirror unit 24a at the cap 41 at the rear of the unit. Complete sealing is provided on the T1,T2,T3 tubes, so that the beam path will remain clear of contamination. Referring to the continuation of the unit at FIG. 3b, a simplified diagrammatic view of the wrist unit 19 of FIG. 2 is depicted, and as stated above, the three concentric drive tubes, T1, T2, and T3 are driven by respective drive motors M1, M2, and M3 in the nonrotating forearm 31. The simplified structure shows that the drive tube T1 provides the roll 1 movement, i.e., complete wrist rotation around the roll 1 axis 26. A bevel gear, G1 on drive tube T2 serves to provide the rotational movement to the turret housing 27, around the roll 2 axis 28, since gears G1 and G2 (on the turret housing 27) are in mesh. In order to provide rotary movement to the tooling plate 22, the innermost drive tube T3 has a bevel gear G3 located at its inboard end, in mesh with the gear G4 of a rotary spindle 42 supported in the turret housing 27. The spindle 42 also has a gear G5 at its opposite end, in mesh with gear G6 of the tooling plate spindle 43 so that the tooling plate 22 will rotate around the roll 3 axis 29. Mirrors 44,45 are supported as shown, within the respective turret housing 27 and base housing 25. Here it may be appreciated that while fixed mirror assemblies are depicted, the units may be provided with adjustable mounts, as are fully depicted in the copending application, Ser. No. 840,637. The sealing tubes 46,47 and 48 are sealed at seal points A, B, and C, to provide a closed path for the laser beam 23.

The laser collimator of FIGS. 1 and 2 is shown affixed to the tooling plate 22, and is therefore movable through a wide variety of multispatial orientation with respect to the robotic base 20.

While the invention has been shown in connection with a preferred embodiment, it is not intended that the invention be so limited, but rather the invention extends to all such designs and modifications as come within the scope of the appended claims.

What is claimed is:

1. In an articulatable robotic structure, a robotic marking system, comprising:
   a laser forearm, movable on said robotic structure, having a forward end, an aft end, and an internal forearm beam path connecting said forward and aft ends;
   a laser beam source means connected to said aft end of said forearm for providing a laser beam traveling said beam path from said aft end to said forward end;
   laser wrist means carried at said forward end of said forearm for receiving and manipulating said beam, said wrist means including a tooling plate and means for moving said tooling plate with respect to said forearm;
   a laser marker galvo head affixed to said tooling plate, said head including galvo head means for moving said laser beam through a predetermined output pattern with respect to said tooling plate;
   first control means for moving said tooling plate through predetermined spatial movements; and
   second control means for driving said galvo head means.

2. The robotic marking system of claim 1, wherein said laser beam source means includes:
   a laser generator carried on said forearm; and
   a laser beam conductor connecting said generator to said aft end of said forearm.

3. The robotic marking system of claim 2, wherein said laser generator has an exit path parallel to said forearm beam path, and wherein said beam travels said exit path in a direction generally toward said aft end of said forearm, and wherein said laser beam conductor includes means for reversing the beam travel direction from said exit path, into said internal forearm beam path.

* * * * *